INVENTORS
MICHAEL RAMUN
DANIAL MARIAN
BY Francis J. Klempay
ATTORNEY

April 9, 1957  M. RAMUN ET AL  2,788,224
SPRING SUSPENSION FOR LOAD-BEARING ROAD VEHICLES
Filed Oct. 27, 1955  2 Sheets-Sheet 2

INVENTORS
MICHAEL RAMUN
DANIAL MARIAN
BY Francis J. Klempay
ATTORNEY

United States Patent Office 2,788,224
Patented Apr. 9, 1957

2,788,224

SPRING SUSPENSION FOR LOAD-BEARING ROAD VEHICLES

Michael Ramun and Daniel Marian, Youngstown, Ohio

Application October 27, 1955, Serial No. 543,096

2 Claims. (Cl. 280—124)

This invention relates to an improved spring suspension arrangement for load-bearing road vehicles of the truck or trailer type and has as its principal object an improved arrangement for carrying the transported loads on the axles of such vehicles whereby the starting and forward movement of such vehicles is assisted and whereby the running gear of the vehicles including the spring suspension thereof is subjected to less deterioration in normal operation.

Heretofore, the common practice in heavy load suspension in road vehicles has been to apply the downward thrust of the load onto suitable springs of the semi-elliptical leaf type with the heightened center or load concentrating portions positioned directly and vertically above a longitudinal or principal axis of the wheel-mounting axles of the vehicles, regardless of whether the axles are alive or merely dead trailing axles. With this arrangement, the weight of the load on the vehicle is precariously balanced on and above the axles, and in starting particularly as well as during absorption of road irregularities the axles tend to escape the load by rolling or twisting either forwardly or rearwardly depending on the direction of the forces applied to the vehicle body or wheels. In light vehicles the top or full leaf springs may be adequate to resist this torque or twist applied by the axles but in heavy load-bearing vehicles it becomes necessary to utilize torque bars spaced longitudinally along the principal axes of the axles and pivoted at one end to the axles at points spaced well down from the bottom surfaces of the springs while the other ends of these torque arms are pivotally connected to the rigid frame of the vehicle structure. Thus, the torque arms form with the forward or rearward halves of the springs parallelogram linkage which tends to maintain the vertical orientation of the axles under all conditions of load and spring flexing. However, these parts and pivotal connections must be freely fitted for proper operation and the axles retain their tendency to rock either fore or aft.

Aside from the rapid wear on the torque rod connections and the stretching and loosening of the spring bolts which results from the above described rocking movement of the axles, it should be noted that an adverse effect on the starting or forward movement of the vehicle will arise if the center line of the axle is aft of the effective downward thrust of the springs during downward flexing or rebound of the springs. In such case the vehicle wheels are accelerated in a backward direction, and since such wheels are quite massive and heavy, suitable power is required to overcome the inertia of this backward component of movement and to accelerate the wheels into synchronous running with the principal frame of the vehicle. Thus, increased tire wear is evident on heavy load-bearing vehicles having poorly designed or poorly maintained torque arms on the load-bearing axles.

The present invention overcomes the above outlined objectionable characteristics of present spring suspension arrangements by so positioning the load-bearing axles in relation to the downward thrust of the springs supported thereon that the center lines or principal axes of the axles are positioned substantially forwardly of the effective downward thrust. In this manner during starting of the vehicle when the load always tends to settle downwardly and during normal running of the vehicle when high spots in the roadway raises the axles and flexes the springs the axles always tend to move forwardly. Any resultant acceleration in rotation of the wheels is accordingly always in a forward direction to assist rather than retard the continued forward motion of the vehicle, and since the torque arms, spring bolts, and other component members are always in effect prestressed or pre-loaded, wear and other deterioration of the parts are substantially reduced. Power requirements for starting th vehicle and maintaining it in forward motion is reduced as is also tire wear.

The principles of our invention and a representative physical embodiment of the same can be better understood by referring to the accompanying drawings wherein.

Figure 1:
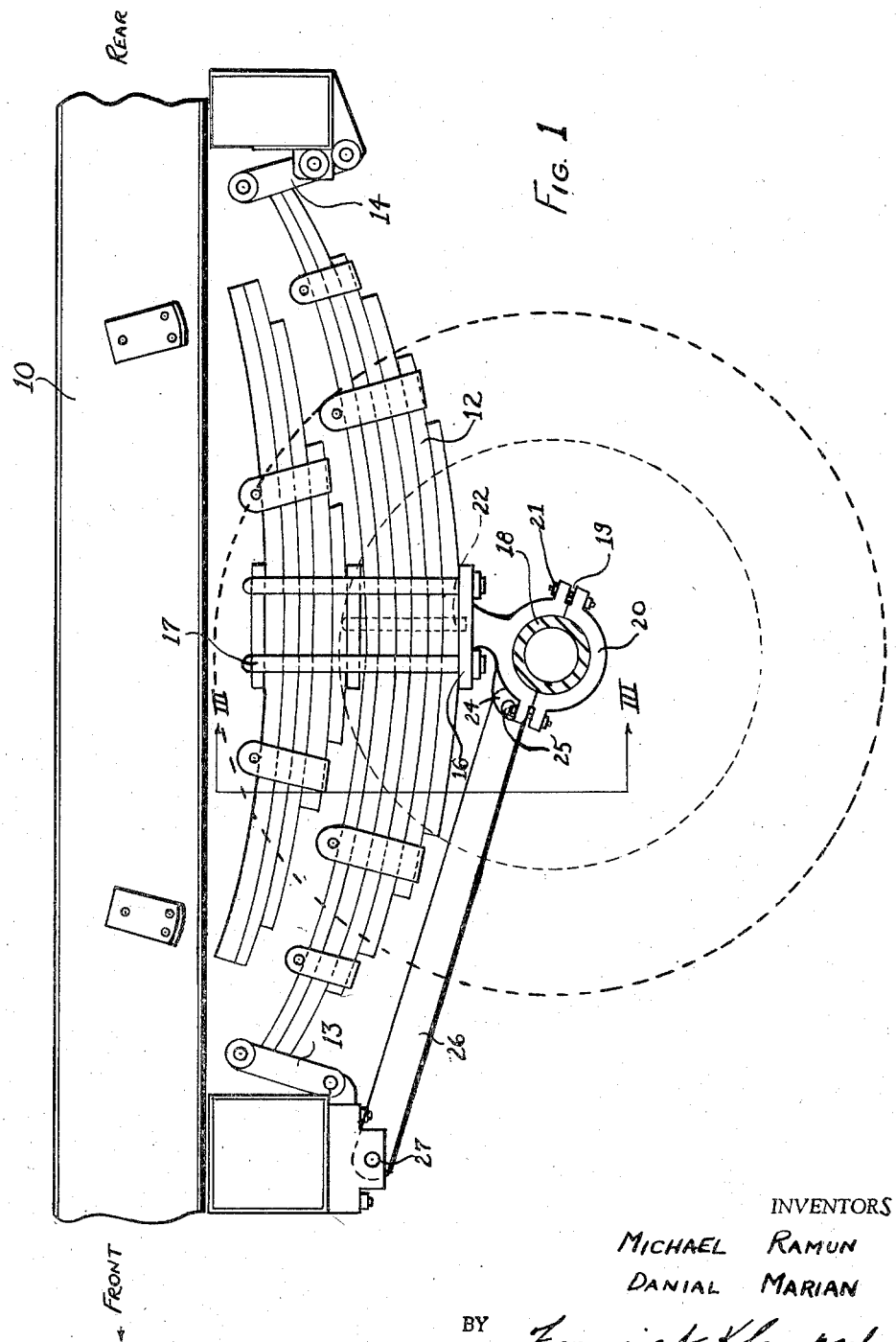
Figure 1 is a fragmentary vertical sectional view of a trailer chassis embodying our invention.
Figure 2:
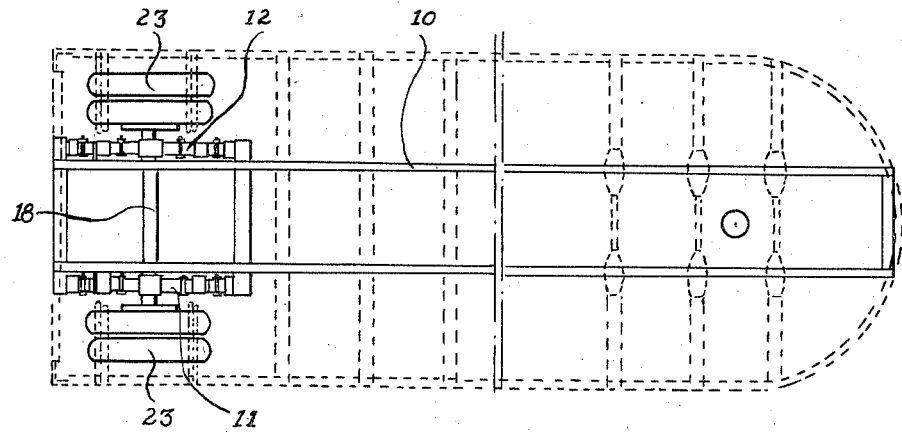
Figure 2 is a fragmentary plan view of the chassis of Figure 1.
Figure 3:
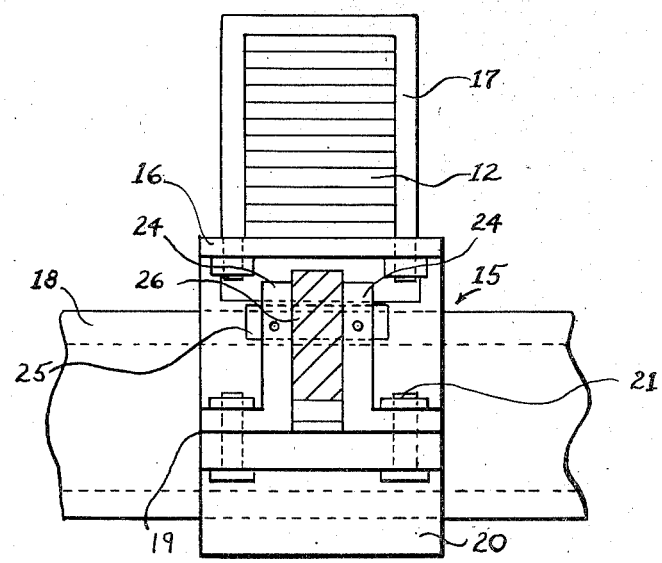
Figure 3 is a fragmentary sectional view taken along the line III—III of Figure 1.

Our invention may be applied equally well to newly manufactured or existent vehicles and, as shown in the drawing, such vehicles may have a rigid load-bearing frame 10 supported on a spaced pair of elliptical spring assemblies 11 and 12 which, in accordance with usual practice, are pliably connected at their ends to the vehicle frame by the pivoted shackles 13 and 14. In this manner the weight of the frame and the load supported thereon is applied to the ends of the spring assemblies for pliant vertical movement with respect to the heavier or center portions of the spring assemblies and, also in accordance with usual practice, suitable means may be provided for transferring the weight from the center portions of the spring assemblies to the transverse axle of the vehicle on which is mounted the load-bearing wheels. In the prior art, the universal practice is to so locate the road-bearing axles of the vehicles that their principal axes are vertically aligned with the effective centers of the springs. In the present invention, however, and for the reasons outlined above, these axles are, in each instance, positioned forwardly of such centers, and this is accomplished by the improved modified parts now to be described.

Rigidly secured in depending relation to the center portions of the springs 11 and 12 are the fittings 15 each having a horizontal disposed pad 16 on its upper end to which is rigidly clamped the assembled leaves of the springs by the U-bolts 17. The fittings 15 are formed to encompass a load-bearing axle which, in the drawing, is shown as a tubular member 18. To facilitate assembly and disassembly of the parts as well as to hold the axle in tight gripping relation, the fittings 15 are split as shown at 19 with the lower or cap portions 20 thereof being rigidly clamped to the principal body portions thereof by the bolts 21. In accordance with usual practice, the pads 16 of the fittings 15 are each provided in their upper surfaces with a recess or bore to receive the lower ends of locating pins 22 which pass through the centers of the various leaves of the spring assemblies to retain these leaves in proper relation to each other and which have the further important function of locating the center portions of the load-bearing pads of the axle fittings.

The salient feature of the present invention is the offset nature of the fittings 15 whereby the principal axis of the axle 18 is positioned materially forward of the center of the pads 16 and thus also materially forward of the locating pins 22. As indicated in Figure 1 the axis of rotation of the road-engaging wheels 23 is coincident with the principal axis of the axle 18, and the overall effect of this arrangement during any downward surge of weight on the spring assemblies is to tend to rock the fittings 15 about a transverse axis parallel with the principal axis of the axle 18 and passing through the forward upper edges of the pads 16. Such tendency to rotation will be in a clockwise direction as viewed in Figure 1 and it should be apparent that any such rotation, even though minute, as may arise from looseness of the parts or from inherent strain in the metals of the parts, will effect acceleration of the road-engaging wheels only in a forward or proper direction to assist in forward propulsion of the vehicle, to minimize wear and tear of the parts, and to reduce tire wear.

Formed integrally with the forward portion of the upper section of each of the fittings 15 is a pair of spaced ears 24 arranged to receive, in spanning relation therewith, a pivot pin 25. Pivotally mounted on the pin 25 and positioned between the ears 24 is a torque arm 26 which is pivotally connected at its forward end to the frame of the vehicle as shown at 27 in Figure 1. As shown, the location of the pivot pin 25 is not far removed downward from the upper forward edge of the pad 16 so that the torque arm 26 offers little resistance to the twisting of the fittings 15 in a clockwise direction as viewed in Figure 1 while, nevertheless, the torque arm 26 remains quite effective in restraining forward or rearward bodily movement of the wheel and axle assembly during normal flexing of the spring assemblies.

It should now be apparent that we have provided an improved spring suspension for load-bearing road vehicles which accomplishes the objects initially set out. It is impossible in the structure of this invention for the load of the vehicle to be precariously balanced directly over the load-bearing axle whereby the latter can unpredictably oscillate forwardly and rearwardly of the effective vertical application of the load force. The parts are so shaped and proportioned that for all road grades the effective downward force application is always rearward of the axis of the axle of the wheels. The effect of weight surges on the vehicle springs therefore always operates to tend to move the axle and wheels forwardly which reduces power requirements, aids in starting, while minimizing tire and parts wear.

In addition to the above advantages of the invention, it should be noted that upon the application of braking force to vehicle wheels mounted according to the present invention and the resultant tendency of the wheels to be retarded while the load continues its forward motion the heavy resultant load applied to the axle originates to the rear of the axle and not directly thereabove or forwardly of the same as in the prior art. Again, there is no tendency of the axle to twist rearwardly and the torque arms remain in compression so that less chatter results from the braking action and consequently the same is more efficient, and wear and tear of the parts and tires is reduced. There is also less tendency of the braking apparatus and of the wheel suspension assembly generally to fail under the severe stresses encountered during emergncy braking action.

Since changes may be made in the construction specifically disclosed herein without departing from the spirit or scope of the invention, reference should be had to the appended claims in determining the scope of the invention.

We therefore claim:

1. In a load-bearing road vehicle of the kind having a frame, a transversely extending wheel-mounting axle and transversely spaced spring structures for transferring the load from said frame to the axle, the improvement comprising a pair of transversely spaced fittings interconnecting the axle and the spring structures each rigidly clamped to the axle and having a pad adapted rigidly to receive portions of the spring structures, said fittings being formed so as to offset the principal axis of the axle and wheels forwardly of the center portions of said pads whereby said wheels and axle tend to be driven forwardly by the weight applied by the spring structures to said pads, said fittings each being formed of two separable parts whereby the axle is detachably clamped in said fittings, the plane of separation of said parts being inclined upwardly in a forward direction while passing substantially through the principal axis of the axle, and a pair of transversely spaced torque rods connected at their forward ends to the frame of the vehicle forwardly of the axle and pivotally connected at their rear ends to said fittings whereby the fittings are permitted to twist while rearward and forward bodily movement of the wheels is prevented.

2. Apparatus according to claim 1 further characterized in that said torque arms are pivotally connected to said fittings at points spaced from said plane of separation, the forward poriton of one of said parts of each of said fittings being provided with a pair of forwardly extending and transversely disposed ears, a pivot pin spanning said ears, and the rear end portions of said torque arms being pivotally mounted between the ears on the pins thus provided.

References Cited in the file of this patent
UNITED STATES PATENTS

| | | |
|---|---|---|
| 520,476 | Beckert | May 29, 1894 |
| 2,204,988 | Haltenberger | June 18, 1940 |